United States Patent Office 3,399,514
Patented Sept. 3, 1968

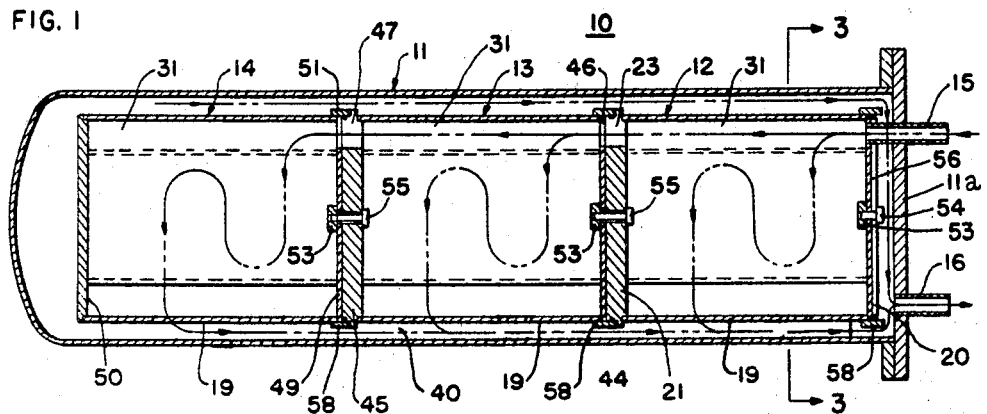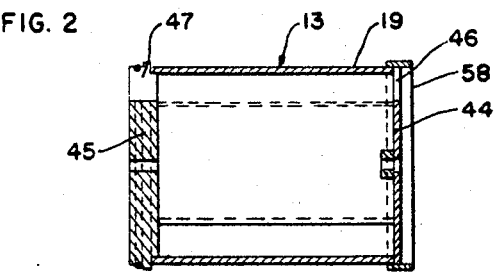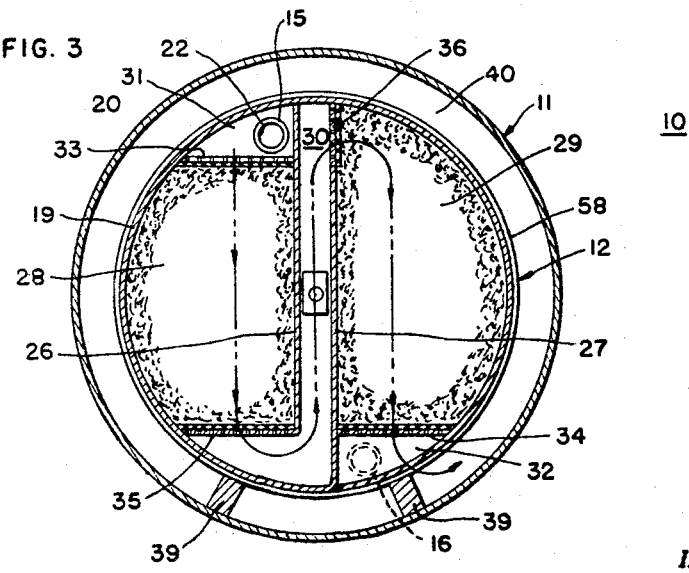

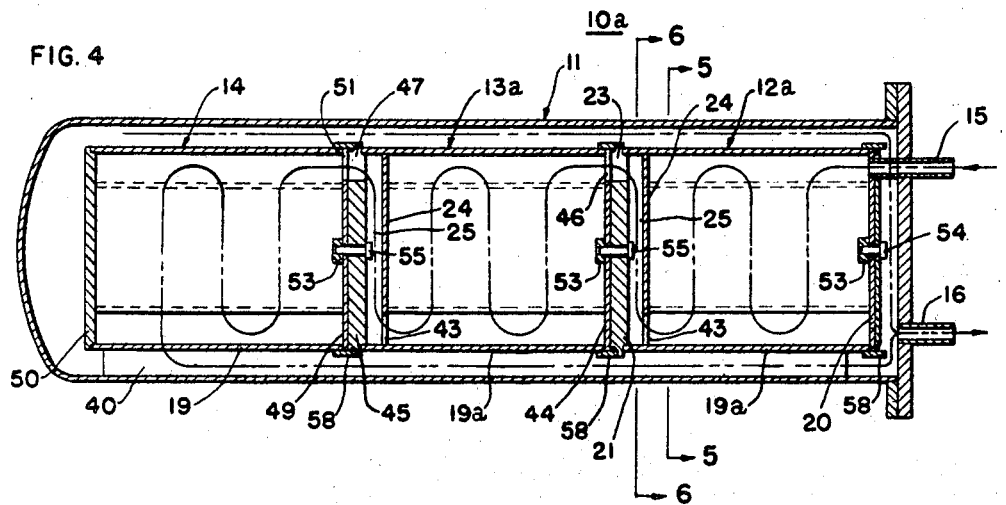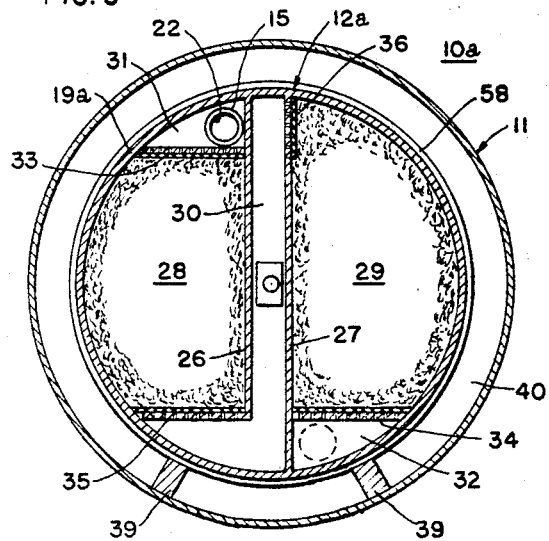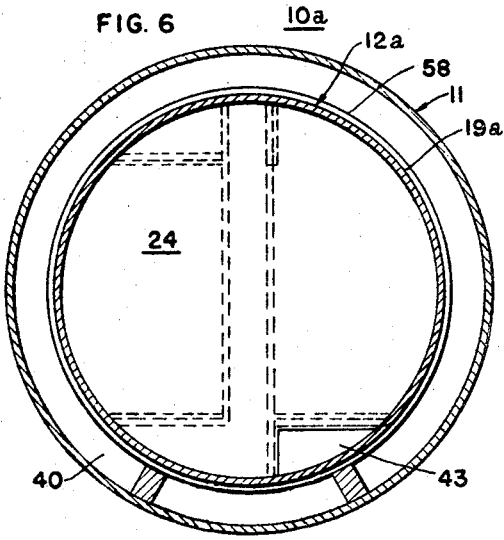

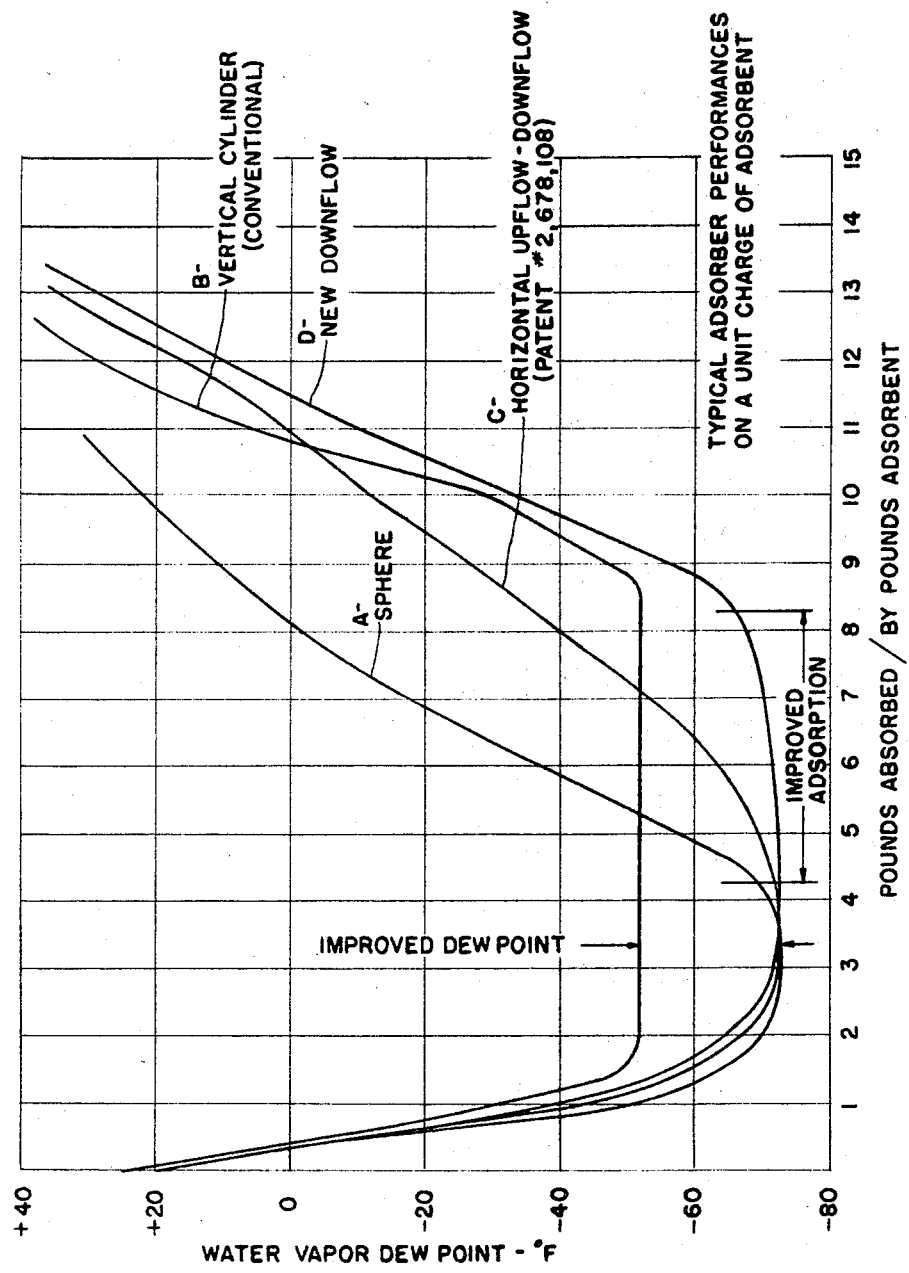

3,399,514
ADSORBER
Laurance S. Reid, 601 Broad Lane,
Norman, Okla. 73070
Filed May 16, 1966, Ser. No. 550,408
9 Claims. (Cl. 55—179)

ABSTRACT OF THE DISCLOSURE

An apparatus for sorbing vapor components from a gas stream while under flow includes a substantially horizontally disposed cylindrical container with vertical partition means dividing the container into a plurality of longitudinal compartments. Gas conduits are provided within the container so that gas flows through each of the compartments in the same direction. Preferably gas passageways communicate between the lower end of one compartment with the upper end of the other compartment so that the gas flow through each sorbing area is downwardly.

---

This invention relates to apparatus for adsorbing compounds from a fluid mixture by means of a permeable bed of solid sorbent and comprises an improvement over my earlier invention described and claimed in United States Patent No. 2,678,108 granted May 11, 1954.

For many years prior to my earlier invention, it had been an accepted conclusion that a vertical cylindrical adsorber vessel with fluid flowing downwardly through it produces the ultimate in adsorbal performance. It was subsequently determined that a short, horizontal cylinder with baffles extending throughout its length, parallel to its axis and closed along one side of the shell and open along the other so that the fluid was passed downwardly along one side of the baffle and upwardly on the other side (or in the opposite sequence) had greater capacity for unit mass of adsorbent than did a vertical cylinder down-flow adsorber, or a thin-bed horizontal rectangular adsorber, or an up-flow and down-flow partitioned spherical adsorber. This discovery led to issuance of my earlier patent referenced above.

In recent years because of the tremendous competitive pressures in the development of electronic analytical instruments, some sophisticated highly sensitive means have been marketed for sensing and measuring trace quantities of components in mixtures. This is particularly true in the area of measuring trace quantities of water vapor in a flowing gas stream. Heretofore, dew points were measured periodically by visual examination of mirrored surfaces which were chilled to a temperature level where formation of a dew point could be observed. Because of the need to warm the mirror between observations, readings were made at fairly long time intervals, and the level to which the temperature could be depressed was limited by the coolants used. Usually propane was employed so that the low temperature limit was about −30° F. and this temperature was recorded as the dew point of the effluent gas until readings were taken at higher temperatures.

For this reason, virtually no attention was commercially given to the efficiency of adsorbents or adsorbers; that is, it was assumed that all adsorbers would remove the adsorbate to the same degree. Modern analytical instruments have shown that this is not so. Not only can they record low concentrations that approach zero but they do this continuously so that it is now possible to record the efficiency (or degree of removal) of the adsorbent or adsorber as well as capacity for the adsorbate.

Accordingly the earlier work represented by my earlier patent has now been extended using a unit mass of adsorbent in a variety of adsorber shapes and configurations including those listed above as well as that herein disclosed. The latter closely resembles the horizontal compartmented transverse up-flow and down-flow adsorber of my earlier patent except that two, closely spaced partition plates are employed instead of one. One of these is attached to one side and both ends of the compartment while the other is attached to the opposite side and both ends so that the gas flows downwardly on one side of the vessel, then upwardly between the two parallel plates and then downwardly on the second side to the outlet. Quite obviously, flow could be upward on one side, downward through the space between the plates and then upward on the second side if one were disposed to operate in this way; downward flow is the preferred direction.

Typical results of comparative tests on adsorber shapes employing the identical quantity of the same adsorbent under identical flow conditions have been made. Such tests were performed on a partitioned sphere, a horizontal partitioned up-flow and down-flow adsorber, a vertical cylindrical down-flow adsorber and the horizontal partitioned down-flow adsorber which is the subject of the present application.

Examination of these data shown that the efficiency of the vertical, cylindrical down-flow adsorber is substantially less than that shown by the others. With respect to the capacity, the horizontal partitioned down-flow adsorber according to the present invention provides greater capacity per unit mass of adsorbent than any of the sphere, the vertical cylindrical vessel or the horizontal, compartmented up-flow and down-flow vessel. These characteristics have been studied and found to be true at a variety of pressures, flow rates and relative humidities (or adsorbate concentrations).

From the test data it was noted that all of the partitioned vessels show an optimum efficiency that, in terms of water vapor dew point, is about 20° F. lower than that displayed by the vertical cylindrical down-flow adsorber of conventional configuration. However, there is a significant difference in the fraction of the total cycle during which this high degree of efficiency is displayed and it was found that the horizontal partitioned down-flow vessel according to the present invention was superior in this regard to the other vessels tested. Regarding capacity of a unit mass of adsorbent, this improved vessel consistently showed a capacity that ranged from five to six percent greater than its nearest competitor. Moreover, the arrangement according to the present invention will produce improved results when applied to other types of adsorber shapes; for example, when applied to a similarly partitioned sphere.

Accordingly it is an object of the present invention to provide a new and improved absorber which possesses the above advantages over the prior known adsorbers.

Another object of the present invention is to provide a new and improved adsorber for adsorbing impurities from a fluid mixture.

Yet another object of the present invention is to provide a new and improved adsorber which maintains an optimum efficiency over a wide range of each cycle.

Yet another object of the present invention is to provide a new and improved adsorber which has an improved capacity of the adsorber per unit mass of adsorbent.

Further objects and advantages of the present invention will become apparent as the following description proceeds and the features of novelty which characterize the invention will be pointed out with particularity in the claims annexed to and forming a part of this specification.

In accordance with these and other objects, there is provided an improved apparatus for sorbing vapor components from a gas stream while under flow. In one respect the present invention may be considered an improvement over my above mentioned earlier patent. More specifically the improved apparatus comprises a substantial horizontally disposed cylindrical container with vertical partition means in the container dividing the container into first and second longitudinal compartments. Gas conduits are provided within the container so that gas flows through each of the compartments in the same direction. More specifically gas passage means communicate between the lower end of one compartment with the upper end of the other compartment. In a preferred embodiment of the invention this gas passage means comprises two parallel walls, one of which is attached to one side and both ends of the container while the other is attached to the opposite side and both ends of the container.

Moreover it is understood that the container may be formed as a self contained pressure vessel. On the other hand the container may be in the form of canister type cells insertable within a pressure shell of standard diameter so that capacity of the complete unit is a function of the length only. Moreover the canister-type cells within the pressure shell may be connected either in parallel, in a series cluster, or as series clusters in parallel.

For a better understanding of the present invention, reference may be had to the accompanying drawings wherein:

FIG. 1 is a cross sectional view of an improved absorber wherein a plurality of adsorber cells according to the present invention are inserted within a pressure vessel and are connected in parallel;

FIG. 2 is a cross sectional view of one of the typical cells of FIG. 1;

FIG. 3 is a cross sectional view of the adsorber of FIG. 1, taken along line 3—3 of FIG. 1, and drawn to a larger scale;

FIG. 4 is a cross sectional view of an adsorbed including a pressure vessel containing a plurality of adsorber cells according to the present invention, and connected in series within the pressure vessels;

FIG. 5 is a cross sectional view of the adsorber of FIG. 4, taken along line 5—5 of FIG. 4, and drawn to a larger scale;

FIG. 6 is a cross sectional view of the adsorber of FIG. 4, taken along line 6—6 of FIG. 4, and drawn to a large scale; and FIG. 7 is a graphical representation of the efficiency of various types of adsorbers employing the identical quantity of the same adsorbent under identical flow conditions.

Referring now to the drawings, and particularly to the embodiment of FIGS. 1 through 3, there is illustrated an adsorber, generally illustrated at 10, shown with a separate pressure vessel or shell 11 containing a plurality of canister-type adsorber cells 12, 13, and 14 according to the present invention, and connected for parallel operation. The pressure shell is provided with a suitable gas inlet 15 and a suitable gas outlet 16 extending through an end or head 11a of the shell 11. Each of the cells 12, 13, and 14 are similar, except through the arrangement of their end plates to provide the desired gas flow openings.

Referring now more specifically to the construction of the adsorber cells, and particularly to cell 12 as illustrated in FIGS. 1 and 3, a typical cell includes a generally cylindrical side casing 19 closed by end plates 20 and 21. The end plate 20 is provided with a suitable gas inlet means here shown as an aperture 22 receiving the gas inlet 15. Additionally the end plate 21 is provided with a passageway 23, FIG. 1, directing a portion of the flow of contaminated gas to the next canister cell 13 for parallel cleansing thereof.

In accordance with the present invention each of the cells is provided with suitable vertical partition means dividing the container into first and second longitudinal compartments. In the illustrated embodiment the vertical partition includes a first vertical wall 26 secured to the top of the casing 19 and to the two end plates 20 and 21, but spaced from the bottom of the casing 19. The second vertical wall 27 extends from the bottom of the casing 19 connecting to the end plates 20 and 21. In this manner the vertical walls 26 and 27 divide the container 12 into a pair of compartments 28 and 29 for containing sorbing material such as granular sorbing material and spaced apart to provide a gas passageway 30 therebetween.

To provide for the flow of gas through the container 12, there is provided a suitable inlet passageway 31 above the compartment 26, and a suitable outlet passageway 32 below the compartment 29. For retaining the sorbent material in the compartments 28 and 29, a suitable perforated plate or screen 33 separates the inlet passageway 31 from the remainder of the compartment 28, and an additional perforated plate or screen 34 separates the outlet passageway 32 from the remainder of the compartment 28. Additionally a pair of perforated plates or screens 35 and 36 define gas passageways between the vertical walls 26 and 27 and the adjacent ones of the compartments.

The containers 12, 13, and 14 are supported within the pressure shell 11 on suitable supports 39 so that each of the containers is spaced from the shell 11 defining a gas passageway 40 between the casing 19 of the container and the pressure shell 11.

Although a typical container has been described above, it will be understood that the containers 12, 13, and 14 have their end plates suitably modified to perform the desired gas directing function. More specifically the cell 13, as represented in FIG. 2, includes the casing 19 closed by end plates 44 and 45. The end plate 44 is provided with a suitable gas passageway 46 aligned with the gas passageway 23 to receive unfiltered flow, and the end plate 45 is also provided with a gas passageway 47 to provide for directing a portion of the gas flow in a parallel path into the last container 14.

The container 14 includes the casing 19 closed by end plates 49 and 50 and the end plate 49 is provided with a gas passageway 51 aligned with the gas passageway 47 in the cell 13 to receive a flow of unfiltered gas. The end plate 50, on the other hand, being in the end cell has no gas passageways but is a solid plate.

The cells 12, 13, and 14 are secured together in any suitable manner. In the illustrated embodiment the forward end plate 20, 44, and 49 of each of the cells 12, 13, and 14 respectively is provided with a central threaded nut 53 receiving securing bolts 54 and 55. It will be observed that there is provided a forward plate 56 fixedly secured within the pressure shell 11 through which the first of the bolts 54 passes.

To properly align and seal the cells 12, 13, and 14 relative to each other, each cell is provided with an outer ring 58 engaging the adjacent plate of the cell 12 or 13 in front of it.

From the above detailed description, the operation of the adsorber 10 according to the present invention is believed clear. However, briefly, it will be understood that, in the illustrated embodiment, there are provided three adsorber cells or containers 12, 13, and 14 connected for parallel flow of a contaminated medium therethrough. More specifically contaminated medium entering the gas inlet 15 will be directed into the inlet passageway 31 of each cell, as indicated by the arrows in FIG. 1, so that approximately an equal quantity thereof will be directed through the adsorbing medium of each of the three cells 12, 13, and 14. As best illustrated in FIG. 3, the contaminated gas entering each of the cells will be first directed downwardly through the compartment 28, will then be directed upwardly through the passageway 30 between the vertical walls 26 and 27, and thereafter will be again directed downwardly through the compartment 29. The gas leaving the compartment 29 will flow through the gas passageway 40 between the cells and the pressure shell 11 to be withdrawn from the gas outlet 16.

It will be understood that the sorbers according to the present invention may be built in a variety of forms, either as the separate canisters illustrated in FIGS. 1, 2, and 3, for insertion in a pressure shell or pressure vessel, or the sorber may, if desired, be formed as a pressure vessel itself. Moreover each of the sorbers may comprise one or more separate cells. In the embodiment of FIGS. 1, 2, and 3, the cells were installed in a pressure shell in parallel with three cells; in a later embodiment there is illustrated the arrangement of three canister-type cells within a pressure shell connected in series. Moreover, if desired, two or more sets of these series arrangements can be used in a single pressure cell arranged in parallel sets. The canister arrangement permits standardization of canister dimensions and diameter of the pressure shell. This done, capacity of the unit is a function of the number of cells required and the shell length required to house them.

Referring now to the embodiment of FIGS. 4, 5, and 6, there is illustrated an adsorber 10a formed of a pressure shell 11 and containing a plurality of canister-type adsorber cells or containers 12a, 13a, and 14 connected for series flow of contaminated medium through each of the containers. It will be understood that the structure in the adsorber 10a, not otherwise more fully described, is identical to that of adsorber 10. The containers 12a and 13a are similar to the containers 12 and 13, heretofore described, but have differently arranged end walls or baffles to provide for the desired series gas flow; the container 14 is identical to the container 14 described in the embodiment of FIGS. 1, 2, and 3. It will be understood that the pressure shell 11 includes the gas inlet 15 and a gas outlet 16 extending through one end thereof.

Referring now to the individual containers 12a, 13a, and 14, and considering first the container 12a, as typical of containers 12a and 13a, the container 12a includes a cylindrical casing 19a closed at one end by the end plate 20 and at the other end by the end plate 21. The end plate 20 is provided with the gas inlet means 22 receiving the gas inlet 15. Spaced inwardly from the end plate 21 is a transverse baffle 24, best illustrated in FIG. 6, defining a gas passageway 25 with the end plate 21.

To provide the desired flow path, the containers 12a, 13a, and 14 are further divided by suitable vertical longitudinally extending means such as the illustrated vertical walls 26 and 27. The walls 26 and 27 divide the containers 12a, 13a and 14 into the compartments 28 and 29, and define the gas passageway 30 therebetween. The inlet passageway 31 is defined above the compartment 28 and the outlet passageway 32 is defined below the compartment 29. Moreover a perforated plate or screen 33 is provided at the top of compartment 28 to define the inlet passageway 31 and a second perforated plate or screen 34 positioned near the bottom of compartment 29 defines the outlet passageway 32. Additionally perforated plates or screens 35 and 36 separate the gas passageway 30 from the compartments 28 and 29.

The containers 12a, 13a, and 14 are supported within the pressure shell in like manner as in the embodiment of FIGS. 1, 2, and 3; namely by the supports 39. The containers 12a, 13a, and 14 are spaced apart from the inner surface of the pressure shell 11 to define the gas passageway 40 therebetween.

It will be understood that fluid flowing through the container 12a will enter through the gas passageway 23, into the inlet passageway 31, directed downwardly through the screen 33 through the compartments 28, then passing upwardly in the gas passageway 30 defined between the vertical walls 26 and 27, and again being directed downwardly through the compartment 29 into the outlet passageway 32. From the oulet passageway 32 the gas will flow through an outlet opening 43 in the baffle 24, then upwardly between the baffle 24 and the end plate 21 and will be discharged through the gass passageway 23 in the end plate 21. The gas will pass directly from the discharge opening 23 into the gas passagway 46 in the end plate 44 of the center container 13a. The container 13a, in all other respects, is identical to the container 12a, heretofore described so that the gas will pass in two passes downwardly through the compartments of the container 13a, being discharged into the gas passageway 51 of the cell 14. In this manner the gas flow is serially through the three containers 12a, 13a, and 14a.

As pointed out above, test data was obtained comparing the partitioned vessels according to the present invention, both in terms of water vapor or dew point and in terms of capacity of a unit mass of absorbent, compared with spherical, vertical cylindrical down flow, and improved up-flow down-flow vessels according to my prior patent. The results of the test data are illustrated in FIG. 7. As therein illustrated curve A represents the water vapor dew point obtained with a spherical absorber plotted against the pounds absorbed per pound of absorbent; curve B is a similar curve for a vertical cylindrical absorber; curve C represents a horizontal up-flow down-flow absorber according to my earlier patent; and curve D is a similar curve plotted for the present down-flow absorber according to the present invention. It will be observed from the test data that each of the spherical, horizontal up-flow down-flow, and the new down-flow absorbers all attain an improved water vapor dew point approximately 20° F. below the conventional vertical cylindrical absorber. Moreover, as of these three with the lower dew point, the new down-flow absorber had an improved absorption in pounds of absorbed contaminants per pounds of absorbent approximately double the capacity of the other units.

In addition to the significantly improved performance characteristics illustrated by the curves of FIG. 7, the present improved adsorber has certain other advantages. Inherent design makes rapid regeneration possible, particularly when contrasted with that characteristic of the vertical cylindrical down-flow adsorber whose length-diameter ratio is 4:1 minimum and preferably greater (in this design this ratio should range from about 1:1 to no more than 3:1). The use of the canister-type cells or containers permits the simplest form of internal insulation to be applied to the pressure shell and this enhances both the performance of the unit and its economics.

Moreover although two specific embodiments of the invention have been illustrated, it will be apparent that numerous other embodiments may be devised by those skilled in the art. For example, it will be understood that an internal insulation between the pressure shell and the canisters may be applied which would be of a metal-sheathed inside so it would not affect the annulus but would require either a greater diameter pressure vessel or a small diameter canister set. Additionally although a plurality of canister-type cells are shown both parallel connected and series connected, it will be understood that the cells may be banked with several parallel paths of series connected cells. Moreover the present invention may be applied to other types of adsorber shells in addition to the horizontal cylindrical type, such as a spherical adsorber. Accordingly it is intended in the appended claims to cover all such modifications and embodiments as fall within the true spirit and scope of this invention.

What is claimed as new and desired to be secured by Letters Patent of the United States is:

1. An apparatus for sorbing vapor components from a gas stream while under flow comprising a substantially horizontally disposed cylindrical container, a pair of vertical partition wall means axially extending in said container dividing said container into first and second longitudinal compartments, each having upper and lower end sections, gas inlet means communicating with one end section of said first compartment, gas passage means communicating from the other end section of said first compartment and between said wall means to the opposite one end section of said second compartment, gas outlet means communicating with the other end section of said second compartment, so that gas entering said gas inlet means passes in series through both of said compartments in the same direction, and granular sorbing material substantially filling said compartments.

2. An apparatus as set forth in claim 1 wherein said gas inlet means communicates with the upper end section of said first compartment so that gas flow through each compartment is downwardly.

3. An apparatus as set forth in claim 1 wherein one of said walls is attached to the top and to both ends of the container and the other of said walls is attached to the bottom and to both end walls of the container.

4. An apparatus as set forth in claim 1 and including a pressure vessel shell, said container being positioned within said shell, said shell including a gas inlet communicating with said gas inlet means of said container and a gas outlet communicating with said gas outlet means of said container.

5. An apparatus as set forth in claim 4 and including at least one additional container within said shell.

6. An apparatus as set forth in claim 5 wherein the gas inlet is in communication with the gas inlet means of each container within said shell and the gas outlet is in communication with the gas outlet means of each container so that the containers within said shell are connected for parallel flow of gas.

7. An apparatus as set forth in claim 5 wherein the gas inlet is in communication with the gas inlet means of the first mentioned container and the gas outlet is in communication with the gas outlet means of the last mentioned container, and the gas outlet means of said first mentioned container is in communication with the gas inlet means of said last mentioned container so that the containers in said shell are connected for series flow of gas through said vessel shell.

8. An apparatus for sorbing vapor components from a gas stream while under flow comprising a container, a pair of vertical partition wall means axially extending in said container dividing said container into first and second compartments, gas inlet means communicating with said first compartment adjacent its upper end, gas passage means communicating from the lower end of said first compartment and between said wall means to the upper end of said second compartment, gas outlet means communicating with said second compartment adjacent its lower end, so that gas entering said gas inlet means passes downwardly in series through both of said compartments, and sorbing material substantially filling said compartments.

9. An apparatus as set forth in claim 8 wherein said container is a substantially horizontally disposed cylinder.

References Cited
UNITED STATES PATENTS

| | | | |
|---|---|---|---|
| 2,678,108 | 5/1954 | Reid | 55—344 |
| 3,094,574 | 6/1963 | Glasgow et al. | 55—174 |
| 3,212,238 | 10/1965 | Welch et al. | 55—174 |

REUBEN FRIEDMAN, *Primary Examiner.*

C. N. HART, *Assistant Examiner.*